United States Patent [19]
Wolcott

[11] Patent Number: 5,336,642
[45] Date of Patent: Aug. 9, 1994

[54] CANASITE-APATITE GLASS-CERAMICS

[75] Inventor: Christine C. Wolcott, Horseheads, N.Y.

[73] Assignee: Corning Incorporated, Corning, N.Y.

[21] Appl. No.: 114,759

[22] Filed: Sep. 1, 1993

[51] Int. Cl.$^5$ .................. C03C 10/16; C03C 3/112
[52] U.S. Cl. ................................ 501/3; 501/10; 501/57
[58] Field of Search .............. 501/3, 10, 57; 65/33

[56] References Cited

U.S. PATENT DOCUMENTS

| | | | |
|---|---|---|---|
| 3,981,736 | 9/1976 | Broemer et al. | 106/39.6 |
| 4,386,162 | 5/1983 | Beall | 501/3 |
| 4,397,670 | 8/1983 | Beall | 501/3 |
| 4,536,481 | 8/1985 | Flannery et al. | 501/32 |
| 4,643,982 | 2/1987 | Kasuga et al. | 501/8 |
| 4,652,534 | 3/1987 | Kasuga | 501/5 |
| 4,775,646 | 10/1988 | Hench et al. | 501/2 |
| 5,536,480 | 8/1985 | Flannery et al. | 501/32 |

Primary Examiner—Mark L. Bell
Assistant Examiner—Deborah Jones
Attorney, Agent, or Firm—Milton M. Peterson

[57] ABSTRACT

A glass-ceramic biomaterial having high strength and toughness, a family of glasses from which the glass-ceramic biomaterial can be produced, and a method of production. The material has a primary crystal phase of F-canasite and a secondary crystal phase of F-apatite. The glass family is $SiO_2$—$CaO$—$Na_2O$—$K_2O$—$P_2O_5$—F. The method may be a single stage heat treatment, or a two stage involving an initial nucleation and a subsequent crystallization.

11 Claims, 2 Drawing Sheets

CANASITE-APATITE GLASS-CERAMICS

FIELD OF THE INVENTION

Glass-ceramic biomaterials containing canasite and apatite crystal phases.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps: melting a mixture of raw materials, usually containing a nucleating agent, to produce a glass; forming an article from tile glass and cooling the glass below its transformation range; crystallizing ("ceramming") the glass article by an appropriate thermal treatment. The thermal treatment usually involves a nucleating step at a temperature slightly above the transformation range, followed by heating to a somewhat higher temperature to cause crystal growth on the nuclei.

Use of a glass-ceramic as a biomaterial was initially proposed by W. T. MacCullouch in a publication entitled "Advances in Dental Ceramics" in British Dental Journal, 124:361-365 (1968). The glass-ceramics proposed were from the $Li_2O$—$ZnO$—$SiO_2$ system for production of dentures.

Subsequently, numerous patents have issued disclosing bio-active glass-ceramic materials. Predominantly, the materials are phosphorus-containing, have an apatite crystal phase, and may contain a second crystal phase and a residual glassy phase. Among materials in clinical use are an apatite-phlogopite material in Europe and apatite-wollastonite materials in Japan. Substantial activity in the United States has been by L. Hench et al. at the University of Florida. This activity has centered on glass, and more particularly on development in vivo of a strong bond between bone and glass. This is said to involve formation of a hydroxycarbonate apatite (HCA) layer.

U.S. Pat. Nos. 4,386,162 and 4,397,670 (Beall) disclose glass-ceramics containing canasite as a predominant crystal phase. Canasite is described as a multiple chain silicate exhibiting an anisotropic, blade-like crystal habit, and having the formula $Ca_5Na_4K_2[Si_{12}O_{30}]F_4$. The canasite-containing glass-ceramics have been found to exhibit exceptional mechanical strength and fracture toughness.

It would, of course, be highly desirable to provide bio-active glass-ceramics that have greater mechanical strength and toughness values than those found in the known bio-active glass-ceramics containing apatite. Therefore, it would be desirable to marry the strength and toughness of the chain silicate glass-ceramics to the bioactivity of the apatite glass-ceramics. It is a basic purpose of this invention to provide this desirable combination.

SUMMARY OF THE INVENTION

The invention resides in part in a glass-ceramic biomaterial having a bending strength greater than 25,000 psi (172 MPa), a fracture toughness greater than 2.5 MPa m $\frac{1}{2}$ (2.3 Kpsi×in $\frac{1}{2}$), a primary crystal phase of F-canasite, a secondary crystal phase of F-apatite, a crystal phase structure including interlocking blades of F-canasite with at least a portion of the F-apatite crystals within the interlocking F-canasite blades, and a residual glassy phase.

The invention further resides in a glass capable of being cerammed to a glass-ceramic containing F-canasite and F-apatite crystals consisting essentially of, as calculated in weight percent, on an oxide basis,

| Oxide | Wt. % | Oxide | Wt. % |
| --- | --- | --- | --- |
| $SiO_2$ | 42–70 | F | 3–11 |
| CaO | 20–30 | $B_2O_3$ | 0–3 |
| $Na_2O$ | 6–12 | $Al_2O_3$ | 0–5 |
| $K_2O$ | 3–10 | $ZrO_2$ | 0–6 |
| $P_2O_5$ | 2–13 | | |

PRIOR ART

Figure 1:
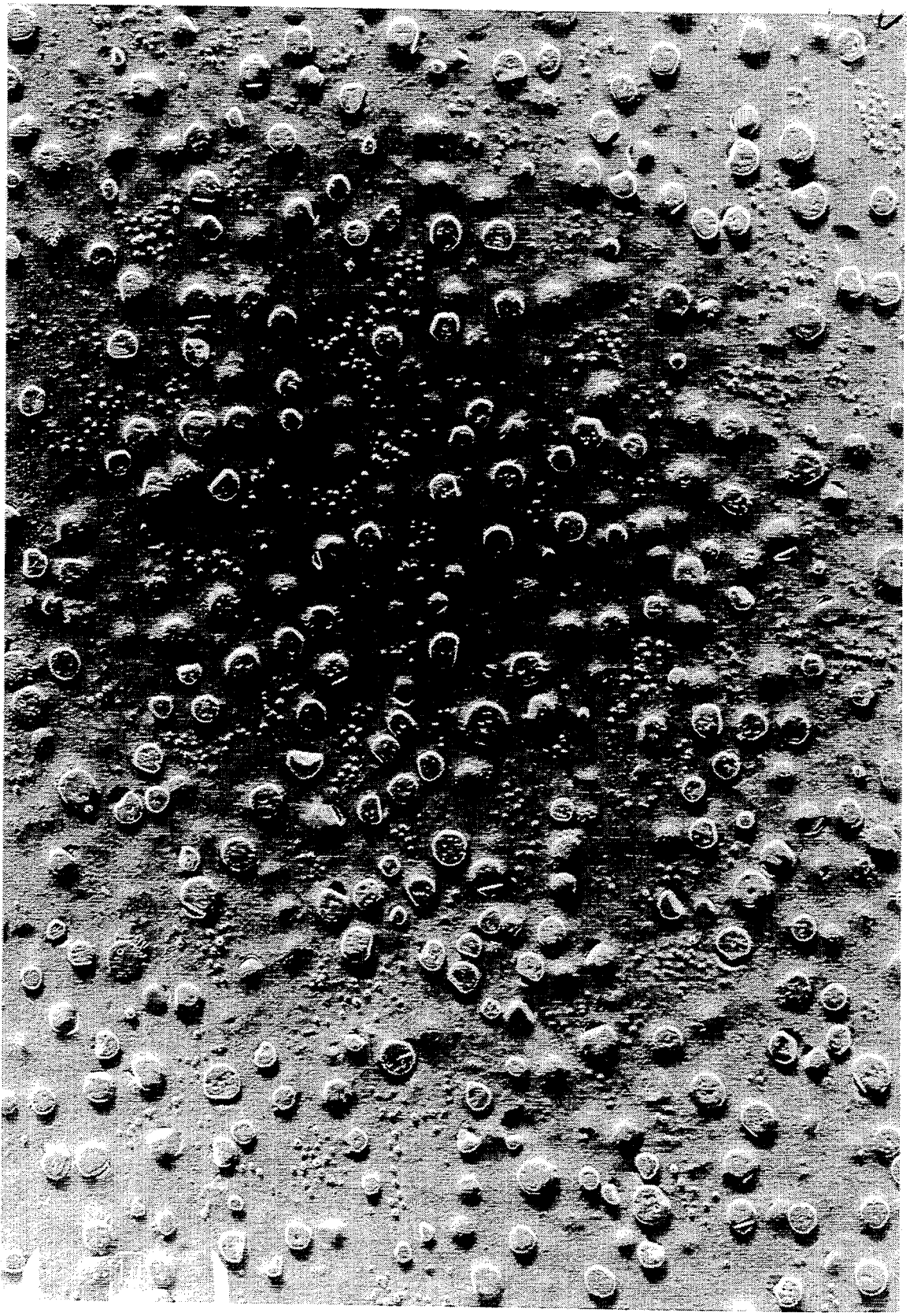
FIGS. 1 and 2 in the accompanying drawing are photomicrographs showing the representative microstructure of a typical material of the invention as a glass (FIG. 1) and as a glass-ceramic (FIG. 2).

In addition to the art noted earlier, attention is called to the following United States Patents:

U.S. Pat. No. 3,981,736 (Broemer et al.).

Discloses a glass-ceramic that is biocompatible, that is composed of 20–60% $SiO_2$, 5–40% $P_2O_5$, 2.7–20% $Na_2O$, 0.4–20% $K_2O$, 2.9–30% MgO, 5–40% CaO, and 0.5–3% F, and that contains apatite crystals in a glassy matrix.

U.S. Pat. No. 4,643,982 (Kasuga et al.).

Discloses a high strength, biocompatible glass-ceramic containing apatite and anorthite crystals.

U.S. Pat. No. 4,652,534 (Kasuga).

Discloses a biocompatible glass-ceramic containing apatite and wollastonite crystals.

U.S. Pat. No. 4,775,646 (Hench et al.).

Discloses a fluoride-containing, bio-active, $Na_2O$—CaO—$P_2O_5$—$SiO_2$ glass wherein a substantial part of tile CaO is present as $CaF_2$.

U.S. Pat. Nos. 4,536,480 and 4,536,481 (Flannery et al.) disclose opal glasses having apatite-type crystals as the opacifying phase.

Applicant is unaware of any disclosure of a mixed canasite and apatite glass-ceramic, or of canasite as a biomaterial.

DESCRIPTION OF THE INVENTION

The present invention is based on discovery of a family of glass compositions that can be hatched and melted to produce relatively stable glasses. It is further based on the discovery that the glasses thus produced can be cerammed, that is thermally crystallized in situ, to produce glass-ceramic biomaterials.

These materials have a primary crystal phase, F-canasite, a secondary crystal phase, F-apatite, and a residual glassy phase or matrix. F-apatite has the formula $Ca_5(PO_4)_3F$. Fluorine is substituted for the hydroxyl group conventionally present in naturally-occurring apatite. In addition, the glass-ceramics may contain a small amount of cristobalite. The glasses are internally nucleated, generally dependent on the presence of $CaF_2$ and $P_2O_5$.

The glass composition family of the invention consists essentially of the following constituents expressed in percent by weight:

| Oxide | Range (Wt. %) |
| --- | --- |
| $SiO_2$ | 42–70 |
| $P_2O_5$ | 2–13 |
| CaO | 20–30 |
| $Na_2O$ | 6–12 |
| $K_2O$ | 3–10 |
| F | 3–11 |
| $B_2O_3$ | 0–3 |
| $Al_2O_3$ | 0–5 |
| $ZrO_2$ | 0–6 |

Glass melts are produced in customary manner by formulating and mixing batches, melting the batches, pouring the melts and cooling. A cooled melt may be clear, opal, or partially crystallized, depending primarily on three factors: $P_2O_5$ content, F content and cooling rate. As is commonly recognized, rapidly cooling a glass melt diminishes the tendency for an opal phase or crystals to form, Accordingly, it is common practice to pour a melt into cold water, that is, drigage the glass, to produce almost instantaneous cooling.

The tendency to opacify, or to form crystals, increases with $P_2O_5$ content. Phase separation to form an opal may occur as low as 2.5% $P_2O_5$ although quenching may control this up to about 8% $P_2O_5$. However, glasses containing over 8 wt. % $P_2O_5$ invariably tend to form crystals of apatite on cooling. However, the crystals appear to be sufficiently dispersed that they do not interfere with subsequent ceramming to a strong glass-ceramic until a $P_2O_5$ content of about 13 wt. % is reached.

Thermal crystallization of the glasses may be a one-step, or a two-step, treatment. The two-step treatment involves an initial nucleation step at a relatively low temperature followed by a crystallization step at a higher temperature. An initial nucleation step tends to produce many sites for ultimate crystallization. This, in turn, leads to development of finer crystals.

Fine crystals may also be obtained with glasses having a high phosphorous content in their composition. During melting, such glasses tend to phase separate, into a silica-rich phase and a phosphate-rich phase. The phosphate-rich phase forms small, well-dispersed, F-apatite crystals.

Glasses in the present composition system generally do not require addition of a component, such as $TiO_2$, solely for nucleation purposes because they are self-nucleated. The self-nucleating agent may be $P_2O_5$, $CaF_2$, or both, depending on the dominance of either agent in the composition.

Thus, there are two modes of nucleation. One mode commonly relies on $P_2O_5$ nucleation, and occurs in glasses having a relatively high phosphate content. The other mode it occurs in glasses having a low $P_2O_5$ content where $CaF_2$ becomes the major nucleating agent.

Crystallization may be achieved at time-temperature cycles varying from 550° C. for several hours to less than an hour at 950° C. However, I prefer an 850° C. for one hour cycle for a one-step treatment. For a two-step treatment, I prefer a two hour nucleation at a temperature in the range of 585°–635° C. followed by a two hour crystallization at 900°–950° C.

A high $P_2O_5$ content glass requires little or no nucleation hold time. It is already phase separated and/or partially crystallized as melted. It is apparent, then, that crystallization schedules are composition dependent, particularly dependent on $P_2O_5$ content.

Figure 2:

FIGS. 1 and 2, in the accompanying drawing, are photomicrographs taken with a magnification of 30,000x.

FIG. 1 depicts a fractured and etched surface on a glass having the composition shown as Example 14 in TABLE I, infra. The glass is an opal having two droplet phases present which appear evenly dispersed. Droplets making up the larger phase are 0.1 to 0.2 microns in diameter. These are thought to be hexagonal F-apatite crystals. The smaller droplets are about 0.03 microns in diameter, and are thought to be phosphate-rich nodules.

The glass was crystallized by heating to a temperature of 850° C., and holding at that temperature for one hour before cooling. FIG. 2 depicts a fractured and etched surface on the glass-ceramic thus produced.

It will be observed that the cerammed microstructure is dominated by large interpenetrating blades of F-canasite. Interspersed within the F-canasite structure, as well as in interstitial glass, are spherulites and short, hexagonal crystallites of F-apatite.

TABLE 1 below, sets forth, in weight % on an oxide basis, the compositions of several glasses melted and studied in the course of determining the metes and bounds of the invention. The compositions are arranged in ascending order of $P_2O_5$ content. Appearances (App.) of test pieces poured from glass melts are also presented.

These glasses are capable of being cerammed to produce glass-ceramics with F-canasite and F–apatite crystal phases and with a residual glassy phase. Examples 20 and 21 are included to show the effect of glasses; with more than about 13% $P_2O_5$. These glasses underwent such severe crystallization in the melt that they could not be cerammed to form a useful glass-ceramic material within the scope of the invention.

TABLE 1

|  | 1 | 2 | 3 | 4 | 5 | 6 | 7 |
| --- | --- | --- | --- | --- | --- | --- | --- |
| $SiO_2$ | 60.6 | 50.1 | 59.9 | 50.6 | 49.0 | 56.7 | 49.9 |
| CaO | 20.6 | 25.6 | 20.5 | 27.8 | 26.8 | 23.1 | 27.6 |
| $Na_2O$ | 7.8 | 8.0 | 7.8 | 7.5 | 7.5 | 7.8 | 7.1 |
| $K_2O$ | 6.1 | 6.1 | 6.1 | 5.7 | 5.7 | 6.1 | 5.4 |
| $P_2O_5$ | 1.6 | 2.4 | 2.5 | 3.0 | 3.0 | 3.1 | 3.9 |
| F | 5.6 | 7.0 | 5.6 | 5.3 | 8.0 | 5.5 | 5.0 |
| $Al_2O_3$ | — | — | — | — | — | — | — |
| $B_2O_3$ | — | — | — | — | — | — | — |
| MgO | — | 0.7 | — | — | — | — | 1.1 |
| App. | Clear | Clear | Opal | Clear | Opal | Opal/Clear | Clear |

|  | 8 | 9 | 10 | 11 | 12 | 13 | 14 |
| --- | --- | --- | --- | --- | --- | --- | --- |
| $SiO_2$ | 46.3 | 54.8 | 48.3 | 44.1 | 42.4 | 47.0 | 47.1 |
| CaO | 28.0 | 22.0 | 27.4 | 28.6 | 25.2 | 28.5 | 26.1 |
| $Na_2O$ | 7.1 | 7.6 | 7.6 | 7.5 | 7.5 | 7.5 | 7.5 |
| $K_2O$ | 5.4 | 5.9 | 5.9 | 5.7 | 5.7 | 5.7 | 5.7 |
| $P_2O_5$ | 4.0 | 6.8 | 7.6 | 8.2 | 8.2 | 8.2 | 8.2 |
| F | 8.0 | 5.0 | 5.5 | 5.9 | 11.0 | 3.0 | 5.3 |
| $Al_2O_3$ | — | — | — | — | — | — | — |
| $B_2O_3$ | — | — | — | — | — | — | — |
| MgO | 1.1 | — | — | — | — | — | — |
| App. | Clear | Opal | Opal | Opal/Crystal | Opal | Clear/Opal | Opal |

|  | 15 | 16 | 17 | 18 | 19 | 20 | 21 |
| --- | --- | --- | --- | --- | --- | --- | --- |
| $SiO_2$ | 44.7 | 44.7 | 44.7 | 53.5 | 43.9 | 39.0 | 31.7 |
| CaO | 23.9 | 21.9 | 21.9 | 21.8 | 24.2 | 21.8 | 25.1 |
| $Na_2O$ | 9.7 | 9.7 | 9.7 | 7.8 | 7.5 | 7.5 | 6.1 |
| $K_2O$ | 7.4 | 7.4 | 7.4 | 5.9 | 5.8 | 5.7 | 4.7 |
| $P_2O_5$ | 8.3 | 8.3 | 8.3 | 8.4 | 13.4 | 18.0 | 19.7 |

TABLE 1-continued

| | | | | | | | |
|---|---|---|---|---|---|---|---|
| F | 6.0 | 6.0 | 6.0 | 4.9 | 5.3 | 8.0 | 4.9 |
| $Al_2O_3$ | — | 2.0 | — | — | — | — | — |
| $B_2O_3$ | — | — | 0.2 | — | — | — | 7.7 |
| MgO | — | — | — | — | — | — | — |
| App. | Opal | Opal | Opal | Opal | Opal | Crystal | Crystal |

A batch was formulated and mixed that corresponded to each composition. Batch materials employed included: Sand, monocalcium phosphate, calcium carbonate, sodium carbonate, potassium carbonate, calcium fluoride, alumina, boron phosphate and magnesium carbonate. A 2.2 lb. (1000 gram) batch of each composition was melted for 3 hours at 1450° C. in a covered platinum crucible, and the melt poured into water. The glass was dried and remelted for one hour at 1450° C. to reduce cord in the glass. The remelted glass was poured in ¼" (6.4mm) thick patties which were annealed at 520° C.

Test pieces of selected glasses were converted to glass-ceramics employing preferred heat treating schedules. Crystal phases in the glass-ceramics were determined by X-ray diffraction patterns. TABLE 2 sets forth the heat treating schedules (°C./hr) and the crystal phases observed.

TABLE 2

| Glass | Schedule (°C./hr) | Crystal Phase |
|---|---|---|
| 14 | 850/1 | FA + C |
| 6 | 585–635/4 | C + minor FA |
| 6 | 585–635/4 900/2 | C + CT + minor FA |

FA = F-apatite
C = Canasite
CT = Cristobalite

A two-step ceramming schedule (nucleation plus crystallization) favors optimum crystal growth where the composition has a low $P_2O_5$ content; with compositions having higher $P_2O_5$ contents, little difference is noted. Crystal grain size is also dependent on the crystallization temperature.

Test pieces of the glass of Example 6 were subjected to various different heat treatment schedules to determine the effect on grain size and strength. In each treatment, the glass was nucleated at a temperature in the 585°–635° C. range for varying times. The nucleation treatments were followed by two hour crystallization heat treatments at temperatures ranging from 685° C. to 1000° C.

TABLE 3 sets forth the nucleation time (Nuc. Time) in hours; the crystallization temperature (Cryst. Temp.) in °C.; the grain size of the cerammed glass as observed visually; modulus of rupture (MOR) as measured in Kpsi (MPa) by a 4 point bend method on abraded bars.

TABLE 3

| Nuc. Time (hrs) | Cryst. Temp. (C.°) | Grain | MOR (Kpsi) (Mpa) |
|---|---|---|---|
| 2 | 685 | Glassy | — |
| 2 | 735 | Coarse | — |
| 2 | 785 | Coarse | — |
| 2 | 850 | Medium | — |
| 2 | 900 | Medium | 27.7 (197) |
| 2 | 950 | Fine | 22.4 (159) |
| 4 | 779 | Fine | — |
| 4 | 850 | Medium | 19.4 (138) |
| 4 | 900 | Very Fine | 29.6 (210) |
| 4 | 950 | Very Fine | 29.5 (209) |
| 4 | 1000 | Melted | — |

TABLE 3-continued

| Nuc. Time (hrs) | Cryst. Temp. (C.°) | Grain | MOR (Kpsi) (Mpa) |
|---|---|---|---|
| 6 | 850 | Medium | — |

Four of the glasses of TABLE 1 were cerammed by heating at 850° C. for one hour. Grain size and strength were determined as in TABLE 3.

TABLE 4

| Glass | Grain | MOR (Kpsi) (MPa) |
|---|---|---|
| 14 | Very Fine | 30.3 (215) |
| 18 | Fine | 19.6 (139) |
| 9 | Fine | 16.7 (119) |
| 10 | Fine | 27.1 (192) |

By way of illustrating the superior physical characteristics of the present glass-ceramics having F-canasite and F-apatite crystal phases, TABLE 5 presents data comparing the glass-ceramics prepared from glasses 14 and 6 with three commercial products; two apatite-wollastonite compositions (A-W) and one apatite-phlogopite (A-P). TABLE 5A presents the data in metric units; TABLE 5B presents the data in U.S. units.

TABLE 5A

| | 14 | 6 | A-W | A-W | A-P |
|---|---|---|---|---|---|
| Young's Modulus (GPa) | 116 | 83 | 117 | — | 70–88 |
| Bending Strength (MPa) | 209 | 204 | 220 | 170 | 100–160 |
| Compressive Strength (MPa) | — | 2103 | 1060 | — | 500 |
| Fracture toughness (MPa m$^{\frac{1}{2}}$) | 3.86 | 3.11 | 2.0 | 2.5 | 0.5–1.0 |

TABLE 5B

| | 14 | 6 | A-W | A-W | A-P |
|---|---|---|---|---|---|
| Young's Modulus (psi × $10^6$) | 16.8 | 12.0 | 17.0 | — | 10.2–12.8 |
| Bending Strength (Kpsi) | 30.3 | 29.6 | 31.9 | 24.7 | 14.5–23.2 |
| Compressive Strength (Kpsi) | — | 304.9 | 153.7 | — | 72.5 |
| Fracture Toughness (Kpsi × in$^{\frac{1}{2}}$) | 3.51 | 2.83 | 1.82 | 2.28 | 0.46–0.91 |

A test piece of glass-ceramic produced from glass 6 of TABLE 1 was tested for biocompatibility and found to be non-cytotoxic and to meet the requirements of the Elution Test, USP XXII. A further polished test piece was placed in a simulated body fluid at 37° C. for a period of two weeks. SEM and XRD studies revealed that a layer of HCA had formed on the polished surface.

The glass-ceramics of this invention are bio-active materials that may be used in a variety of different forms. They may be molded, or otherwise formed, to a desired shape for use as a bone implant or partial replacement. For some purposes, a porous substrate is desired. The present glasses may be reduced to powders of desired particle size. They may then be mixed with a medium and shaped by standard powder processing techniques. The resulting bodies may then be sintered to provide porous F-canasite-F-apatite glass-ceramics. Powders may also be used as components of composites, that is, in cements, or as fillers.

It is well documented that certain glasses containing calcium and phosphorous oxides and/or fluorides are surface-active and may generate phases that promote bonding to bone. In view of this, I believe that the residual glassy phase in the present glass-ceramic biomaterials may play a very significant role. The alkali metal oxides and silica are thought to be the principal active components in the glassy phase for providing bioactivity. However, minor amounts of other oxides, such as MgO and $B_2O_3$, may be present in the glassy phase to the extent that they do not interfere with bioactivity.

I claim:

1. A glass-ceramic biomaterial having a bending strength greater than 25,000 psi (172 MPa), a fracture toughness greater than 2.3 Kpsi$\times$in$^{\frac{1}{2}}$(2.5 MPa m$^{\frac{1}{2}}$), a primary crystal phase of F-canasite, a secondary crystal phase of F-apatite, a crystal phase structure including interlocking blades of F-canasite with at least a portion of the F-apatite crystals within the interlocking F-canasite blades, and a residual glassy phase.

2. An $SiO_2$—CaO—$Na_2O$—$K_2O$—$P_2O_5$—F glass capable of being thermally converted to a glass-ceramic having F-canasite as a primary crystal phase and F-apatite as a secondary crystal phase and having a composition, as calculated in weight % on an oxide basis, consisting essentially of 42–70% $SiO_2$, 20–30% CaO, 6–12% $Na_2O$, 3–10% $K_2O$, 2–13% $P_2O_5$, and 3–11%.

3. A glass in accordance with claim 2 wherein the glass, as melted, is a clear glass containing no more than about 8 weight % $P_2O_5$.

4. A glass in accordance with claim 2 wherein the glass, as melted, is an opal glass containing no more than about 8 weight % $P_2O_5$.

5. A glass in accordance with claim 2 wherein the glass, as melted, contains F-apatite crystals and 8–13 weight % $P_2O_5$.

6. A glass in accordance with claim 2 wherein the glass is self nucleated by $CaF_2$, $P_2O_5$, or both.

7. A method of producing a glass-ceramic biomaterial having a primary crystal phase of F-canasite, and a secondary crystal phase of F-apatite, which comprises melting a glass having a composition, as calculated in weight % on an oxide basis, consisting, essentially of 42–70% $SiO_2$, 20–30% CaO, 6–12% $Na_2O$, 3–10% $K_2O$, 2–13% $P_2O_5$, and 3–11% F, cooling the glass below its transformation range and subjecting the glass to a treat treatment at a temperature higher than the glass transformation temperature range, but, not over 950° C., for a time sufficient to produce F-canasite and F-apatite crystal phases.

8. A method in accordance with claim 7 wherein the heat treatment is in the temperature range of 685°–950° C. for a period of time ranging from four hours to one-half hour.

9. A method in accordance with claim 9 wherein the heat treatment is at a temperature of about 850° C. for about one hour.

10. A method in accordance with claim 7 wherein the heat treatment comprises an initial nucleation stage followed by a crystallization stage at a higher temperature.

11. A method in accordance with claim 10 wherein the initial nucleation stage is at a temperature in the range of 585°–635° C. and the crystallization is at a temperature in the range of 750°–950° C.

* * * * *

UNITED STATES PATENT AND TRADEMARK OFFICE
CERTIFICATE OF CORRECTION

PATENT NO. : 5,336,642
DATED : August 9, 1994
INVENTOR(S) : Christine C. Wolcott It is certified that error appears in the above-identified patent and that said Letters Patent is hereby corrected as shown below:

Column 1, line 21, "tile" should be --the--.

Column 2, line 47, "tile" should be --the--.

Column 2, line 57, "hatched" should be --batched--.

Column 3, line 60, remove the word "it".

Column 4, line 34, "F--apatite" should be --F-apatite--.

Column 4, line 36, remove the ; after the word "glasses".

Column 7, line 26, "3-11%" should be --3-11% F--.

Column 8, line 14, "treat" should be --heat--.

Signed and Sealed this

Sixth Day of December, 1994

*Attest:*

BRUCE LEHMAN

*Attesting Officer*     *Commissioner of Patents and Trademarks*